United States Patent [19]

Bertelson et al.

[11] Patent Number: 5,543,086
[45] Date of Patent: Aug. 6, 1996

[54] SQUARYLIUM DYESTUFFS AND COMPOSTIONS CONTAINING SAME

[75] Inventors: Robert C. Bertelson, Dayton, Ohio; Robert A. Sallavanti, Dalton, Pa.

[73] Assignee: Gentex Corporation, Carbondale, Pa.

[21] Appl. No.: 443,605

[22] Filed: Nov. 30, 1989

Related U.S. Application Data

[63] Continuation-in-part of Ser. No. 84,486, Aug. 12, 1987, abandoned.

[51] Int. Cl.$^6$ .............. C09B 7/02; G02B 5/22; F21V 9/00; F21V 9/04
[52] U.S. Cl. .......... 252/582; 252/587; 548/458; 359/358; 359/886; 430/944; 544/73; 544/99
[58] Field of Search .................. 252/582, 587; 350/312; 548/458; 359/358, 886; 372/11; 430/944; 544/73, 99

[56] References Cited

U.S. PATENT DOCUMENTS

| | | | |
|---|---|---|---|
| 4,175,956 | 11/1979 | Haley et al. | 430/37 |
| 4,500,621 | 2/1985 | Wurster | 430/37 |
| 4,622,174 | 11/1986 | McKoy et al. | 252/582 |
| 4,935,166 | 6/1990 | Lee et al. | 252/582 |
| 5,211,885 | 5/1993 | Zepp | 252/587 |

FOREIGN PATENT DOCUMENTS

| | | |
|---|---|---|
| 85508 | 4/1984 | Japan. |
| 60-169453 | 9/1985 | Japan. |
| 60-228448 | 11/1985 | Japan. |
| 1-228960 | 9/1989 | Japan. |
| 1-228961 | 9/1989 | Japan. |

OTHER PUBLICATIONS

Fieser et al.: "Organic Chemistry", D.C. Heath and Co. Boston (1944), pp. 827–832.

Primary Examiner—Richard D. Lovering
Attorney, Agent, or Firm—Shenier & O'Connor

[57] ABSTRACT

Novel squarylium dyestuffs are formed by condensing one molecular equivalent of squaric acid with two molecular equivalents of a heterocyclic intermediate of the formula

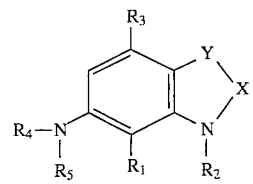

in which X is an optionally substituted ethylene or o-phenylene group; Y is an optionally substituted methylene or imino group, oxygen, sulfur, selenium or (if X is ethylene) a direct bond; and $R_1$ through $R_5$ are various substituents or (except for $R_2$ and $R_5$) hydrogen. A preferred class of dyestuffs are those formed from intermediates in which Y is methylene or a direct bond, the former including 7-acylaminotetrahydroquinolines and the latter including 6-acylaminoindolines. Thus, two molecular equivalents of each of 1-methyl-7-acetamido-1,2,3,4-tetrahydroquinoline and 6-acetamido-1,2,3, 3-tetramethylindoline were condensed with one molecular equivalent of squaric acid to produce respective dyes each having an absorption maximum substantially coincident with the ruby-laser wavelength of 694 nm. The dyes may be incorporated into suitable transparent plastics such as polycarbonate for use in optical filters.

44 Claims, 1 Drawing Sheet

ABSORPTION SPECTRUM OF DYE IN SOLUTION

TRANSMISSION SPECTRUM OF DYE IN PLASTIC

SQUARYLIUM DYESTUFFS AND COMPOSTIONS CONTAINING SAME

BACKGROUND OF THE INVENTION

This application is a continuation-in-part of our application Ser. No. 84,486 filed Aug. 12, 1987, now abandoned. This invention relates to a new class of dyestuffs selectively absorbing in the red and infrared, compositions of matter containing the dyestuffs, and intermediates useful in preparing the same.

Materials absorbing selectively in the red and infrared have numerous military and industrial applications, such as in optical filters for protection against laser or other radiation, electrophotographic plates, optical recording media and optical switches for lasers. Typically such materials are incorporated into suitable transparent plastic substrates, but in certain applications, such as in optical switches for lasers, the materials may be in solution.

To be useful as a light absorber in applications such as those mentioned above, a compound must have several properties in addition to absorption at the desired wavelength. The absorption must be sufficiently selective so as to transmit desired portions of the spectrum, which may be near the wavelength to be attenuated. The compound should be soluble in the solid or liquid medium in which it is used, and should be compatible with the medium and any additives. The compound should be sufficiently stable to permit its incorporation and use in the desired medium without excessive degradation. Finally, the compound should be capable of being readily synthesized on the scale desired.

One class of compounds known to be useful as narrow-band absorbers includes the cyclobutenediylium, or "squarylium" dyes obtained as 1,3-condensation products of 1,2-dihydroxycyclobutenedione ("squaric acid") and various intermediates such as N,N-dialkyl anilines. The preparation of these compounds and their properties are described in Sprenger et al, Angew. Chem. Internat. Edit., 5, 894 (1966). Although the compounds described by Sprenger et al are useful in many of the applications noted, the narrowness of their absorption bands makes their usefulness specific to a given radiation source. As a practical example, condensation products of squaric acid and N,N-dialkyl anilines have an absorption maximum at about 640 nanometers (nm), with very little absorption either below 600 nm or above 670 nm. Such compounds would be of little use, therefore, in an application requiring absorption of ruby laser radiation at 694 nm.

SUMMARY OF THE INVENTION

One object of our invention is to provide a material selectively absorbing at wavelengths of about 700 nm or longer.

Another object of our invention is to provide a material selectively absorbing radiation from commonly used lasers, such as a ruby laser operating at 694 nm.

A further object of our invention is to provide an absorber capable of being used in transparent plastics.

Still another object of our invention is to provide an absorber capable of being readily synthesized on the scale desired.

Other and further objects will be apparent from the following description.

In general, our invention contemplates novel dyestuffs symbolized by Formula I, in which $R_1$ and $R_3$ are hydrogen, alkyl, alkoxy or halogen; $R_2$ and $R_{12}$ are alkyl or aryl; $R_4$ is hydrogen or alkyl; $R_5$ is alkyl or

R being hydrogen or alkyl or aryl; X is the ortho-phenylene

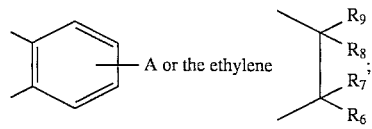

Y is the methylene

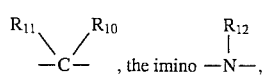

—O—, —S— or —Se—; A is hydrogen, alkyl, hydroxy, alkoxy, amino, monoalkylamino or dialkylamino; and $R_6$ through $R_{11}$ are hydrogen, alkyl or aryl; provided that $R_1$ and $R_3$ may further be alkylene or alkylenoxy, that $R_2$ and $R_6$ through $R_{12}$ may further be alkylene or methylidyne, that $R_4$ and $R_5$ and R may further be alkylene, that one or more pairs of said further R and $R_1$ through $R_{12}$ each have a common bond and form a ring of five or six members, that $R_9$ and $R_{10}$ or $R_9$ and $R_{12}$ may also constitute a direct bond, and that if X is said ethylene then Y may also be a direct bond.

Preferably, $R_1$, $R_3$, $R_4$ and $R_5$ are $C_1$–$C_4$ alkyl if they are alkyl, while $R_1$ and $R_3$ are preferably $C_1$–$C_4$ alkoxy if they are alkoxy and fluorine or chlorine or bromine if they are halogen. As shown in Formula I, the compounds resonate between forms (a) and (b). However, the compounds are conventionally named as if they had form (a), and will be described as such in the discussion that follows. Formula I(c) is identical to Formula I(a) where each Rn is the substituent shown in Formula II(a).

If desired the various alkyl or aryl groups that are present may bear substituents that are inert in the sense that they do not adversely affect the absorptive properties of the compound. Thus, $R_2$, if alkyl, may bear such substituents as hydroxy, alkoxy or acyloxy. Similarly R may bear such substituents as aryl, if it is alkyl, and alkyl or alkoxy if it is aryl. One or more pairs of the further alkylene, alkylenoxy and methylidyne members of the groups R and $R_1$ through $R_{12}$ may be connected in a ring. Particular pairs of such groups include $R_1$ and $R_2$, $R_2$ and $R_6$, $R_2$ and $R_{12}$, $R_3$ and $R_9$ (where Y is a direct bond), $R_3$ and $R_{11}$, $R_3$ and $R_{12}$, $R_4$ and $R_5$ (where $R_5$ is alkyl) or $R_4$ and R (where $R_5$ is —COR), $R_6$ and $R_7$, $R_7$ and $R_8$, $R_8$ and $R_9$, $R_9$ and $R_{10}$, $R_9$ and $R_{12}$, and $R_{10}$ and $R_{11}$. Except as otherwise noted above X, Y and each of the various groups R and $R_1$ through $R_{12}$ and A are selected independently of any other group.

As noted above, Y may represent a direct bond between X and the aromatic ring, in which case the intermediate of Formula II is an indoline, with a five-membered heterocyclic ring. Further, $R_9$ may combine with $R_{10}$ or $R_{12}$ to form a second direct bond between the adjacent ring atoms of a 1,2-dihydroquinoline or 1,2-dihydroquinoxaline, respectively, or its squaric acid derivative.

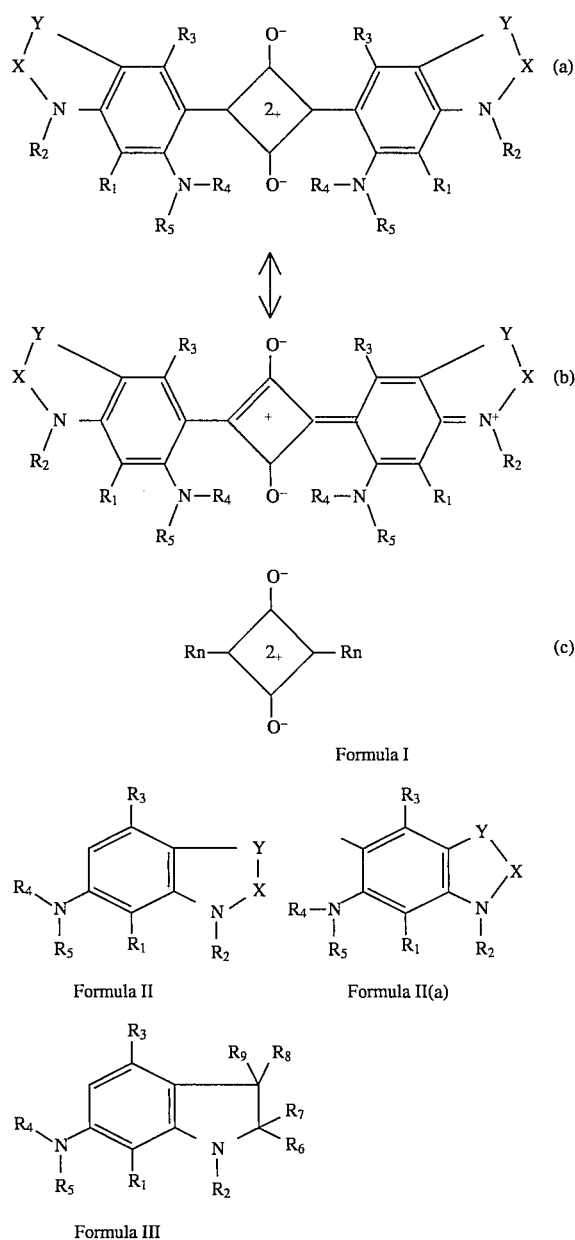

Formula I

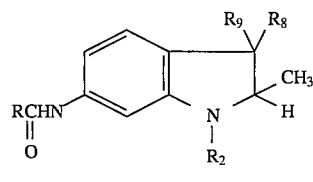

Formula II      Formula II(a)

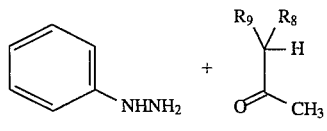

Formula III

The dyestuffs of this invention, i.e., the compounds of Formula I, are prepared in general by the process of condensing one molecular equivalent of 1,2-dihydroxycyclobutenedione ("squaric acid") with two molecular equivalents of the corresponding heterocyclic intermediate of Formula II. Such intermediates include derivatives of indoline, 1,2-dihydroquinoline, 1,2,3,4-tetrahydroquinoline, 2,3-dihydro-1,4-benzoselenazine, 1,2-dihydroquinoxaline, 1,2,3,4-tetrahydroquinoxaline, 9,10-dihydroacridine, 5,10-dihydrophenazine, phenoxazine, phenothiazine, and phenoselenazine. Some specific examples of such heterocyclic intermediates contemplated for use in this invention are given below. The general procedure for condensing aromatic compounds with squaric acid to form 1,3-condensation products is disclosed by Sprenger et al in the reference cited above.

Of the many compounds encompassed by Formula I, the preferred compounds have a heterocyclic ring in which the ring atoms other than the nitrogen bearing the substituent $R_2$ consist solely of carbon. Further preferred are compounds derived from indolines—i.e., compounds of Formula II in which Y is a direct bond from X to the aromatic ring or, equivalently, compounds of Formula III in which $R_1$ through $R_9$ are defined as above—because the required intermediates are readily obtained. A preferred class of indolines are 6-acylaminoindolines—that is, compounds of Formula III in which $R_4$ is hydrogen and $R_5$ is —COR as defined above. The most readily obtained intermediates of this type are indolines of Formula IV in which R, $R_2$, $R_8$ and $R_9$ are all lower ($C_1$–$C_4$) alkyl. Other preferred indolines are those in which $R_4$ is alkyl and $R_5$ is —COR and those in which $R_4$ and $R_5$ are both alkyl. The most readily obtained intermediates of this type are indolines of Formula III in which $R_1$, $R_3$ and $R_6$ are hydrogen; $R_7$ is methyl; $R_2$, $R_4$, $R_8$ and $R_9$ are $C_1$–$C_4$ alkyl; and $R_5$ is $C_1$–$C_4$ alkyl or —COR, where R is $C_1$–$C_4$ alkyl.

Indolines of Formula IV may be obtained by nitrating the indoline of Formula IX (Z=H) in a strongly acid medium to give the nitroindoline (IX Z=$NO_2$) which is reduced (e.g., with stannous chloride) to the aminoindoline (IX, Z=$NH_2$),

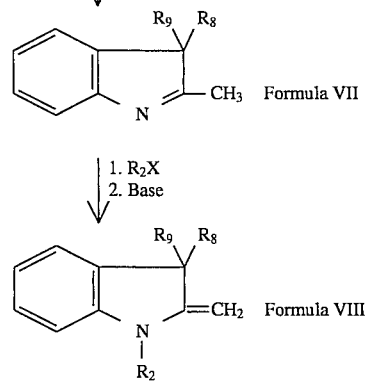

which in turn is allowed to react with for example an acyl anhydride $(RCO)_2O$ or an alkylating agent $R_4X$ to produce the desired intermediate (IX, Z=NHCOR or Z=$NR_4R_4$). Further, the acyl compound (IX, Z=NHCOR) may be allowed to react successively with sodium hydride and an alkyl iodide $R_4I$ to give the tertiary amide (IX, Z=$NR_4$COR).

This latter compound may be hydrolyzed by removal, of the acyl group to give the secondary amine (IX, $Z=NHR_4$), which in turn may be alkylated with a different agent $R_5X$ to give a tertiary amine bearing different substituents (IX, $Z=NR_4R_5$).

The above-described sequence of nitration, reduction, and acylation or alkylation (or both) may be used to prepare other indolines of Formula III, as well as other intermediates of Formula II in general, by starting with the corresponding compound of Formula X in which Z is hydrogen and $R_1$ through $R_5$, X and Y are as in the desired final product.

The initial indolines (IX, Z=H) used to make compounds of Formula IV are conveniently prepared by reduction (e.g., with sodium borohydride or, alternatively, with metallic tin and hydrochloric acid) of the corresponding 2-methyleneindoline of Formula VIII, which in turn may be prepared by reaction of the indolenine of Formula VII with an alkylating agent $R_2X$ such as, for example, a halide, a sulfate, or a p-toluenesulfonate. The indolenine of Formula VII may be prepared by the well-known method of heating together the compound phenylhydrazine (Formula V) and the branched-chain methyl ketone of Formula VI in an acidic medium. The synthetic steps described above are symbolized in the sequence of structural formulae (V–IX) displayed herein.

Other intermediates of Formula X in which Z is hydrogen are either known compounds or readily prepared using known techniques. In specific cases alternative routes to the desired dye intermediate may be preferable. For example, as shown

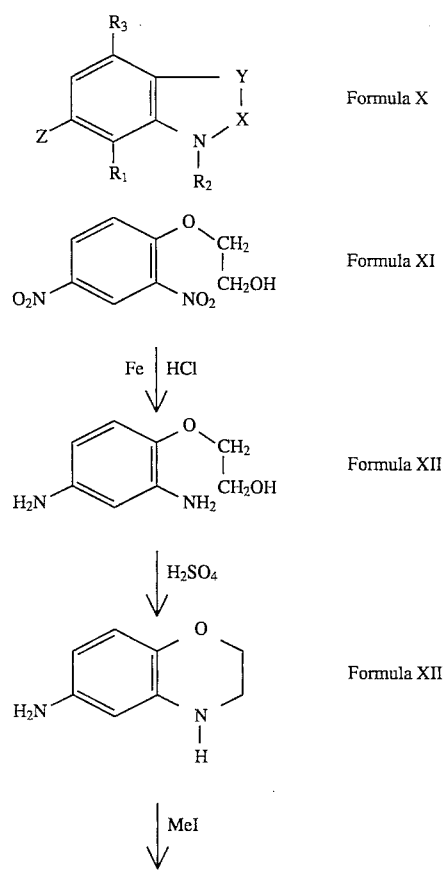

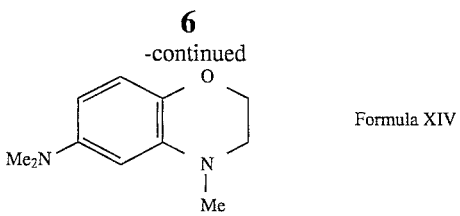

by Formulae XI to XIV, the easily obtainable substance 2-(2,4-dinitrophenoxy)ethanol (Formula XI), upon reduction to the amino compound of Formula XII and treatment with acid, gives the aminodihydrobenzoxazine of Formula XIII, which in turn may be alkylated by standard methods to form, for example, the methylated compound of Formula XIV.

In use, compounds of Formula I may be incorporated into matrices or films of suitable light-transmissive, preferably transparent plastics such as polycarbonate, poly(methyl methacrylate), poly(allyl diglycol carbonate) and cellulose derivatives (preferably esters such as cellulose acetate, cellulose propionate, cellulose butyrate and the like) by such known methods as molding, extruding and casting to make solid sheets, lenses, visors and the like. The compounds may also be used in the form of a static or flowing fluid filter solution, for example, in an outer jacket of a laser. The amount of dye used in a particular application would depend on the degree of absorption desired, and can be readily calculated by using Beer's law. It will be further apparent that compounds of Formula I may be used, either in plastics or in solution, along with other additives such as dyes, infrared absorbers, ultraviolet absorbers, and stabilizers that do not adversely affect the compounds or their absorptive properties.

BRIEF DESCRIPTION OF THE DRAWINGS

In the accompanying drawings to which reference is made in the instant specification and which are to be read in conjunction therewith.

DESCRIPTION OF THE PREFERRED EMBODIMENTS

EXAMPLE 1A 1,2,3,3-Tetramethylindoline (Formula XV, Z=H)

Figure 1:
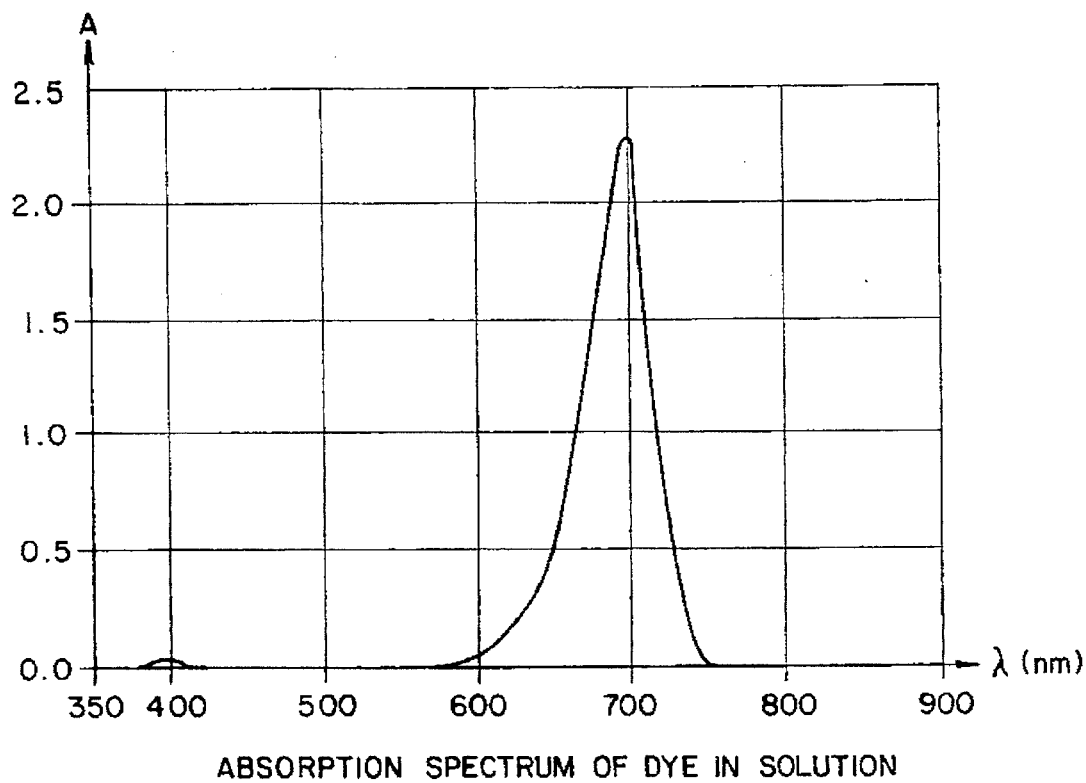
FIG. 1 is a curve of the absorption spectrum of one compound of our invention in solution.

To a stirred solution of 3.46 g of 1,3,3-trimethyl-2-methyleneindoline (VIII, $R_2=R_8=R_9=Me$) in 50 ml methanol was added at room temperature in three portions at about five-minute intervals a total of 1.14 g of sodium borohydride (conveniently, as three 7/16-inch pellets, a commercially available form). The initial deep red color of the solution gradually changed to a light orange during the reaction. The mixture was then diluted first with 20 ml of ethyl ether, and then with 50 ml of water. The ether layer was separated, and the lower aqueous layer was again extracted with ether. The combined ether layers were washed with 10% aqueous sodium hydroxide solution and then water, and dried over anhydrous magnesium sulfate. Removal of solvent from the filtered extracts left 3.10 g (88.6%) of an orange oil. This oil was distilled in vacuum to give 2.52 g (72.0% of the theoretical amount of 3.50 g) of pale yellow oil boiling at 80°–81° C. at 2.3 mm Hg pressure.

EXAMPLE 1B

6-Nitro-1,2,3-tetramethylindoline (Formula XV, Z=NO$_2$)

A solution of 19.0 g of the distilled tetramethylindoline in 300 g concentrated sulfuric acid in a one-liter beaker was chilled to 2°–3° C. in an ice-salt bath, and a mixture of 11.0 g of concentrated nitric acid and 45 g of concentrated sulfuric acid was added dropwise with stirring during a one-hour period. The color of the reaction mixture darkened from a light orange to a deep brown during the addition. The reaction

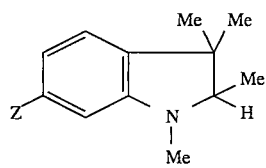

Formula XV

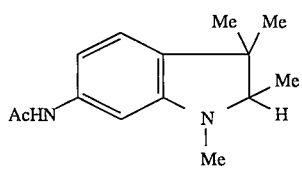

Formula XVI

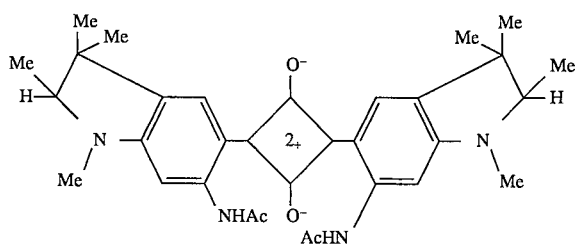

Formula XVII mixture was allowed to come to room temperature, and stirring was continued an additional 16 hours. The mixture was then poured in 400 ml of ice water in a one-liter beaker. This solution was kept in an ice bath while 50% aqueous sodium hydroxide solution was slowly added with stirring until the solution had been brought to a pH of approximately 9. The precipitate that had formed was removed by filtration and washed thoroughly with water on the funnel and then finally with several small portions of ethanol. The air-dried product weighed 18.6 g (78.1% yield) and showed a melting point of 55°–59° C.

EXAMPLE 1C

6-Amino-1,2,3-tetramethylindoline (Formula XV, Z=NH$_2$)

To a mixture of 18.0 g of the 6-nitro compound prepared above and 50 ml of concentrated hydrochloric acid in a beaker was added slowly with stirring a solution prepared from 61.7 g of stannous chloride and 50 ml concentrated hydrochloric acid (some warming and stirring is needed to get all of the tin salt in solution). The reduction mixture turned a light orange color, and was then heated until all solids were in solution. To the clear solution was added 25 ml of concentrated hydrochloric acid, and the mixture was allowed to cool and was finally chilled in an ice bath. After 1–2 hours in the ice bath the solid formed was removed by filtration on a fritted glass funnel and washed once with concentrated hydrochloric acid. The filter cake was sucked as dry as practical to give 33.0 g of pale orange damp solid. This was immediately stored in a sealed container, and was stable as such. This hygroscopic solid appears to be a mixture of the mono- and dihydrochloride and the hexachlorostannate salts of the title aminoindoline.

A solution of 10.0 g of the above salt in 80 ml water was treated with about 10 ml of 50% aqueous sodium hydroxide solution to bring the pH to 10. The mixture was extracted with ether, the ether extracts washed with water and dried over magnesium sulfate, the drying agent removed by filtration, and the solvent removed from the filtrate to leave 2.40 g of a yellow oil that darkened rapidly. Its infrared spectrum showed that the nitro group had been reduced to an amino group. It was used with further purification.

EXAMPLE 1D

6-Acetamido-1,2,3,3-tetramethylindoline (Formula XVI)

To a solution of 2.40 g of the above crude amino compound in 50 ml of pyridine was added 1.19 ml of acetic anhydride with stirring at room temperature. The reaction mixture was heated to 70°–80° C. for about one minute and then cooled and poured slowly with stirring into 80 ml of ice water. The mixture was stirred in an ice bath for about 30 minutes, and then the orangish oil that had precipitated was removed by extraction with ether. The ether extracts were washed with water, dried over magnesium sulfate, and concentrated after removal of the drying agent by filtration. The residual oil weighed 2.84 g (96% of the theoretical yield), and its infrared and proton magnetic resonance spectra showed that the amino group had been converted to an acetamido group.

EXAMPLE 1E 1,3-Bis(6-acetamido-1,2,3,3-tetramethylindolin-5-yl)-2,4-dihydroxycyclobutenediylium dihydroxide, bis(inner salt) (Formula XVII)

A mixture of 0.50 g of the above acetamido compound, 0.125 g of squaric acid, 6.6 ml of benzene, and 16.5 ml of 1-butanol was refluxed with stirring in a flask equipped with a trap for the azeotropic separation of water. The reaction mixture turned a deep blue-green color within 15 minutes. The progress of the reaction was followed by removing small samples for determination of their absorption spectra throughout the region of 350 to 900 nm. After having been refluxed for six hours, the solution was allowed to cool and stand overnight. The dye that had precipitated was removed by filtration, washed well with methanol, and air-dried to give 0.43 g (71.7% of the theoretical yield) of glistening dark green crystals, m.p. 271°–275° C. with decomposition and exhibiting an intense, narrow absorption peak at 694.5 nm in acetone as solvent. The absorption spectrum between 350 and 900 nm is shown in FIG. 1.

Figure 2:
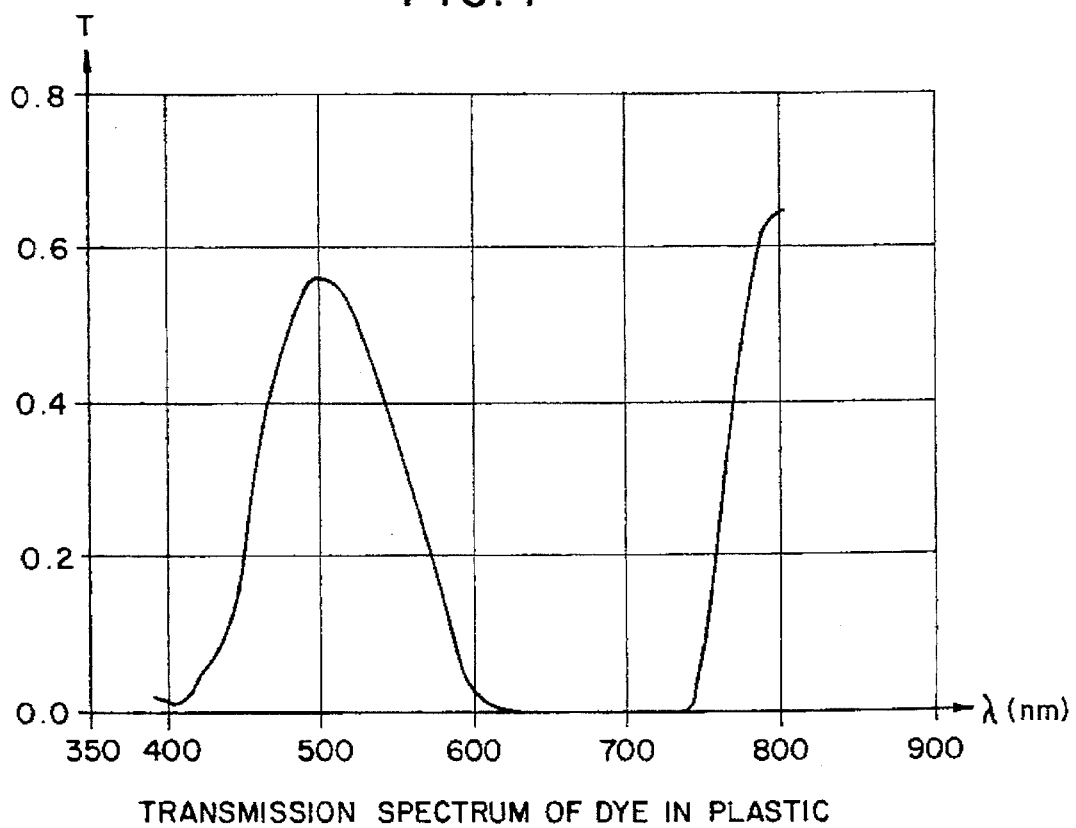
FIG. 2 is a curve of the transmission spectrum of the same compound in a plastic substrate.

EXAMPLE 1F 30 g of polycarbonate resin were introduced into a preheated Braybender Plasticorder at 220° C. and mixed until melted with the twin screws rotating at 40 rpm. At that time 0.006 g of the product of Example 1E (0.02% by weight)

was introduced into the molten polycarbonate. Screw rotation was increased to 200 rpm with temperature maintained at 220° C. After 1 minute of such mixing, the rotation was stopped and the molten polycarbonate containing the dye was removed and placed on a template cavity 3 inches in diameter and 0.120 inch thick. This was then sandwiched between two stainless steel cover plates and placed within a Carver press at 230° C. for 30 seconds. A homogenous transparent disk resulted on which a visible specturm was run using a CARY 14 Spectrophotometer. The spectrum at this concentration, shown in FIG. 2, indicated that the resultant part was an effective absorber of visible radiation from about 610 nm to 740 nm. A spectrum of a similar plate containing a lower concentration of the dye indicated a minimum transmission at about 695 nm.

EXAMPLES 2 TO 25

Compounds of Formula I are similarly prepared by condensing one molecular equivalent of squaric acid with two equivalents of each of the indoline intermediates shown in Table 1, which are variously substituted on the heterocyclic ring. In the table Me represents methyl, Et ethyl, Bu butyl, Ph phenyl and Ac acetyl. The intermediate of Example 44 is 6-(N-methylacetamido)-1,2,3,3-tetramethylindoline. The condensation of this intermediate with squaric acid yielded the dye 1,3-Bis [6-(N-methylacetamido)- 1,2,3,3-tetramethylindolin-5-yl]-2,4-dihydroxycyclobutenediylium dihydroxide, bis (inner salt). This dye exhibited a sharp absorption peak at 723 nm when dissolved in acetone. The intermediate of Example 45 is 6-dimethylamino- 1,2,3,3-tetramethylindoline. The condensation of this intermediate with squaric acid yielded the dye 1,3-Bis[6-dimethylamino- 1,2,3,3-tetramethylindolin-5-yl]-2,4-dihydroxycyclobutenediylium dihydroxide, bis (inner salt). This dye exhibited a sharp absorption peak at 778 nm. when dissolved in acetone. Cyclohexane rings are formed by $R_8$ and $R_9$ in Example 19, by $R_6$ and $R_7$ in Example 20, and by $R_7$ and $R_8$ in Example 22. In Example 25 $R_6$ and $R_7$ and $R_8$ and $R_9$ form cyclopentane rings. In Example 19, $R_8$ may be considered as methylene and $R_9$ as butylene. Alternatively $R_8$ may be considered as ethylene, propylene or butylene and $R_9$ as propylene, ethylene or methylene, respectively. The same observations also apply to $R_6$ and $R_7$ of Example 20 and will apply to $R_8$ and $R_9$ of subsequent Examples 76–81. In Example 22, one of $R_7$ and $R_8$ may be considered as methylene and the other as propylene or both may be considered as ethylene. The same observation also applies to $R_6$–$R_7$ and $R_8$–$R_9$ of Example 25. This observation will further apply to $R_9$–$R_{10}$ in subsequent Examples 58–63, to $R_7$–$R_8$ in Examples 64–69, to $R_{10}$–$R_{11}$ in Examples 70–75, to $R_7$–$R_8$ in Examples 100–105, and to $R_7$–$R_8$ in subsequent Examples 108–113.

EXAMPLES 26 to 45

Compounds of Formula I are prepared in a manner similar to that of Example 1 by condensing one molecular equivalent of squaric acid with two molecular equivalents of each of the indoline intermediates of Table 2, which are variously substituted on the benzene ring. In Example 44a, $R_4$ and $R_5$ form a five-member heterocyclic ring. $R_4$ may be considered as methylene and R as ethylene or $R_4$ may be considered as ethylene and R as methylene.

EXAMPLES 46 TO 81

Compounds of Formula I are prepared in a manner similar to that of Example 1 by condensing one molecular equivalent of squaric acid with two molecular equivalents of each of the corresponding 1,2,3,4-tetrahydroquinolines of Table 3. The intermediate of Example 46 is 1-methyl-7-acetamido-1,2,3,4-tetrahydroquinoline. The condensation of this intermediate with squaric acid yielded the dye 1,3-Bis [1-methyl-7-acetamido-1,2,3,4-tetrahydroquinolin-6-yl]-2,4-dihydroxycyclobutenediylium dihydroxide, bis (inner salt). This dye exhibited a sharp absorption peak at 693 when dissolved in chloroform. The peak absorption wavelength for a squarylium dye incorporating the six-membered heterocyclic quinoline intermediate of Example 46 is nearly identical to that for a dye incorporating the five-membered heterocyclic indoline intermediate of Example 1E. Cyclohexane rings are formed by $R_9$ and $R_{10}$ in Examples 58 to 63, by $R_7$ and $R_8$ in Examples 64 to 69, and by $R_8$ and $R_9$ in Examples 76 to 81. In Examples 70 to 75 $R_{10}$ and $R_{11}$ form a cyclopentane ring.

The dyes of our invention are solids of generally dark green color, when in the form of relatively large crystals, and are solids of generally greenish-brown color, when in powdered form as where the particles are either amorphous or relatively small crystals. These solids have purities typically ranging between 85% and 99.7% by weight but preferably ranging between 92% and 97% by weight. The solids may contain such substances, for example, as benzene, butanol, methanol and water. In the form of either large or small crystals, some solvent of crystallization may be present. There may further inherently be such extraneous substances, for example, as dibutyl squarate or a 1,2 squaric isomer of the desired 1,3 squaric dye or a one-to-one condensation product where Rn is substituted in only one of the 1 and 3 positions instead of in both as in the desired squaric dye.

EXAMPLES 82 TO 105

Compounds of Formula I are prepared in a manner similar to that of Example 1 by condensing one molecular equivalent of squaric acid with two molecular equivalents of each of the corresponding 2,3-dihydro-1,4-benzoxazines (Y=O), benzothiazines (Y=S) and benzoselenazines (Y=Se) of Table 4. In

TABLE 1

Indolines Variously Substituted on Heterocyclic Ring

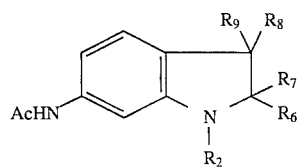

| Example | $R_2$ | $R_6$ | $R_7$ | $R_8$ | $R_9$ |
|---|---|---|---|---|---|
| 2 | Et | H | Me | Me | Me |
| 3 | Bu | H | Me | Me | Me |
| 4 | —$C_2H_4OH$ | H | Me | Me | Me |
| 5 | —$C_2H_4OMe$ | H | Me | Me | Me |
| 6 | —$C_2H_4OAc$ | H | Me | Me | Me |
| 7 | Ph | H | Me | Me | Me |
| 8 | Me | H | Me | Et | Me |
| 9 | Et | H | Me | Et | Me |
| 10 | Bu | H | Me | Et | Me |
| 11 | —$C_2H_4OH$ | H | Me | Et | Me |
| 12 | —$C_2H_4OMe$ | H | Me | Et | Me |
| 13 | —$C_2H_4OAc$ | H | Me | Et | Me |
| 14 | Ph | H | Me | Et | Me |
| 15 | Me | H | Et | Me | Me |
| 16 | Et | H | Et | Me | Me |

TABLE 1-continued

Indolines Variously Substituted on Heterocyclic Ring

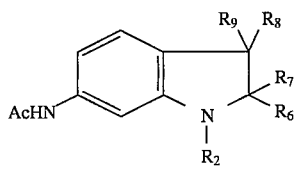

| Example | $R_2$ | $R_6$ | $R_7$ | $R_8$ | $R_9$ |
|---|---|---|---|---|---|
| 17 | Me | H | Me | Et | Et |
| 18 | Et | H | Me | Et | Et |
| 19 | Me | H | Me | $-(CH_2)_5-$ | |
| 20 | Me | $-(CH_2)_5-$ | | Me | Me |
| 21 | Me | H | Me | Ph | Me |
| 22 | Et | H | $-(CH_2)_4-$ | | H |
| 23 | Me | H | Ph | H | H |
| 24 | Me | Me | Me | Me | Me |
| 25 | Me | $-(CH_2)_4-$ | | $-(CH_2)_4-$ | |

TABLE 2

Indolines Variously Substituted on Carbocyclic Ring

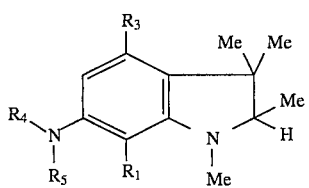

| Example | $R_1$ | $R_3$ | $R_4$ | $R_5$ |
|---|---|---|---|---|
| 26 | H | H | H | $C_2H_5CO-$ |
| 27 | H | H | H | $n-C_5H_{11}CO-$ |
| 28 | H | H | H | $C_6H_5CO-$ |
| 29 | H | H | H | $p-CH_3C_6H_4CO-$ |
| 30 | H | H | H | $p-CH_3OC_6H_4CO-$ |
| 31 | H | H | H | $C_6H_5CH_2CO-$ |
| 32 | F | H | H | Ac |
| 33 | Cl | H | H | Ac |
| 34 | Me | H | H | Ac |
| 35 | OMe | H | H | Ac |
| 36 | H | F | H | Ac |
| 37 | H | Cl | H | Ac |
| 38 | H | Me | H | Ac |
| 39 | H | OMe | H | Ac |
| 40 | F | F | H | Ac |
| 41 | Cl | Cl | H | Ac |
| 42 | Me | Me | H | Ac |
| 43 | OMe | OMe | H | Ac |
| 44 | H | H | Me | Ac |
| 44a | H | H | $-(CH_2)_3CO-$ | |
| 44b | H | H | Me | HCO— |
| 45 | H | H | Me | Me |

TABLE 3

1,2,3,4-Tetrahydroquinolines

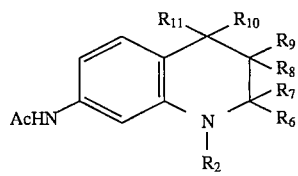

| Example | $R_2$ | $R_6$ | $R_7$ | $R_8$ | $R_9$ | $R_{10}$ | $R_{11}$ |
|---|---|---|---|---|---|---|---|
| 46 | Me | H | H | H | H | H | H |
| 47 | Et | H | H | H | H | H | H |
| 48 | Bu | H | H | H | H | H | H |
| 49 | $-C_2H_4OH$ | H | H | H | H | H | H |
| 50 | $-C_2H_4OMe$ | H | H | H | H | H | H |
| 51 | $-C_2H_4OAc$ | H | H | H | H | H | H |
| 52–57 | as in 46–51 | Me | H | H | H | Me | Me |
| 58–63 | as in 46–51 | H | H | H | $-(CH_2)_4-$ | | H |
| 64–69 | as in 46–51 | H | $-(CH_2)_4-$ | | H | H | H |
| 70–75 | as in 46–51 | H | H | H | H | $-(CH_2)_4-$ | |
| 76–81 | as in 46–51 | H | H | $-(CH_2)_5-$ | | H | H |

TABLE 4

2,3-Dihydro-1,4-Benzoxazines, Benzothiazines and Benzoselenazines

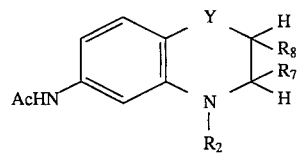

| Example | Y | $R_2$ | $R_7$ | $R_8$ |
|---|---|---|---|---|
| 82 | O | Me | H | H |
| 83 | O | Et | H | H |
| 84 | O | Bu | H | H |
| 85 | O | $-CH_2CH_2OH$ | H | H |
| 86 | O | $-CH_2CH_2OMe$ | H | H |
| 87 | O | $-CH_2CH_2OAc$ | H | H |
| 88–93 | S | as in 82–87 | H | H |
| 94–99 | Se | as in 82–87 | H | H |
| 100–105 | S | as in 82–87 | $-(CH_2)_4-$ | | each of examples 100 to 105, $R_7$ and $R_8$ form a cyclohexane ring.

EXAMPLES 106 to 113

Compounds of Formula I are prepared in a manner similar to that of Example 1 by condensing one molecular equivalent of squaric acid with two molecular equivalents of each of the 1,2,3,4-tetrahydroquinoxalines of Table 5. In Example 107 $R_2$ and $R_{12}$ form an additional six-membered heterocyclic ring, while in each of Examples 108 to 113 $R_7$ and $R_8$ form a cyclohexane ring.

EXAMPLES 114 to 120

Compounds of Formula I are prepared in a manner similar to that of Example 1 by condensing one molecular equivalent of squaric acid with two equivalents of each of the intermediates of Table 6 in which the nitrogen bearing the substituent $R_2$ is incorporated in two or more heterocyclic rings. In prior Example 107, the bridging of the heterocycle by $R_2$–$R_{12}$ creates two further heterocyclic rings, one ring including $R_2$–$R_{12}$ and the two carbon atoms bearing the substituents $R_7$ and $R_8$ and the other ring including $R_2$–$R_{12}$ and the two carbon atoms shared in the fused carbocycle and heterocycle.

The fusing of the heterocycle to a further carbocyclic ring has been shown in Examples 22, 58–63, 64–69, 100–105, and 108–113.

In Example 114 one of $R_2$ and $R_6$ may be considered as methylene and the other as propylene or both may be considered as ethylene. In Example 115 and 117 one of $R_1$ and $R_2$ may be considered as methylene and the other as ethylene.

In Examples 116 and 118, $R_1$ is methylenoxy ([aromatic ring]—O—CH$_2$—) and $R_2$ is methylene. In Example 119, both $R_1$ and $R_2$ are methylene, $R_1$ having methyl substituents. In Example 120, $R_2$ is methylidyne $$(-\overset{|}{C}H-),$$

$R_1$ is ethylene, and $R_6$ is propylene, $R_2$ having a common bond with each of $R_1$ and $R_6$.

In addition to the examples enumerated above, it is possible to use intermediates having a double bond between the 3-carbon and the 4-carbon, or between the 3-carbon and the 4-nitrogen, of a six-membered heterocyclic ring. Thus, in addition to the 1,2,3,4-tetrahydroquinolines of Examples 46 to 81, it is also possible to use 1,2-dihydroquinolines, in which $R_9$ and $R_{10}$ of Table 3 combine to form a second direct bond between the ring carbons. Similarly, in addition to the 1,2,3,4-tetrahydroquinoxalines of Examples 106 to 113, it is possible to use 1,2-dihydroquinoxalines, in which $R_9$ and $R_{12}$ of Table 5 combine to form a second direct bond between the ring carbon and the adjacent ring nitrogen.

It is also possible, in accordance with Formulae I and II above, to use compounds in which X is an optionally

TABLE 5

1,2,3,4-Tetrahydroquinoxalines

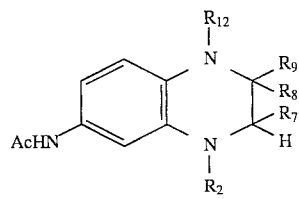

| Example | $R_2$ | $R_{12}$ | $R_7$ | $R_8$ | $R_9$ |
|---|---|---|---|---|---|
| 106 | Et | Et | H | H | H |
| 107 | | —(CH$_2$)$_2$— | H | H | H |
| 108–113 | as in 46–51 | same as $R_2$ | —(CH$_2$)$_4$— | | H |

TABLE 6

Intermediates Containing ≧2 Heterocyclic Rings

| Example | Formula |
|---|---|
| 114 | 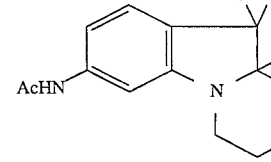 |
| 115 | 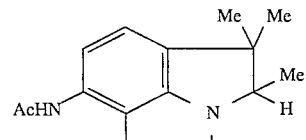 |
| 116 | 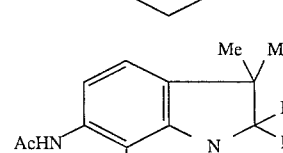 |
| 117 | 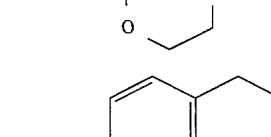 |

TABLE 6-continued

Intermediates Containing ≧2 Heterocyclic Rings

| Example | Formula |
|---|---|
| 118 | 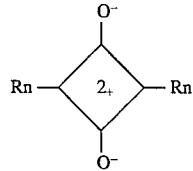 |
| 119 | 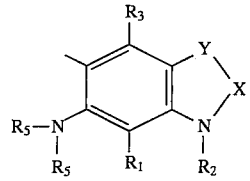 |
| 120 |  | substituted o-phenylene rather than an optionally substituted ethylene as in the examples. Such alternative compounds include derivatives of 9,10-dihydroacridine, 5,10-dihydrophenazine, phenoxazine, phenothiazine and phenoselenazine. One such intermediate in particular is 3,6-bis(dimethylamino)- 9,10-dihydro-10-methylacridine. For such intermediate, $R_1$ and $R_3$ are hydrogen, $R_2$ and $R_4$ and $R_5$ are methyl, Y is the methylene, —$CH_2$—, where $R_{10}$ and $R_{11}$ are hydrogen, X is orthophenylene, and A is dimethylamino in the para position with respect to Y. Such intermediate, which is related to Acridine Orange, and squaric acid are condensed to yield the dye 1,3-Bis [3,6-bis (dimethylamino)-9,10-dihydro-10-methyacridin  -2-yl]-2,4-dihydroxycyclobutenediylium dihydroxide, bis (inner salt).

A second intermediate in particular is 3-dimethylamino-5-phenyl-10-methyl-5,10-dihydrophenazine. For this intermediate $R_1$ and $R_3$ are hydrogen, $R_2$ is phenyl, $R_4$ and $R_5$ are methyl, Y is the imino $NR_{12}$ where $R_{12}$ is methyl, X is ortho-phenylene, and A is hydrogen. This intermediate, which is related to Aposafranine, and squaric acid are condensed to yield a squarylium dye.

A third intermediate in particular is 3,7-bis (dimethylamino)-5-phenyl-10-methyl-5,10-dihydrophenazine. This is similar to the second intermediate except that A, rather than being hydrogen, is instead dimethylamino in the position para to Y. This intermediate, which is related to Safranine, and squaric acid are condensed to yield a squarylium dye.

It will be seen that we have accomplished the objects of our invention. Compounds of Formula I selectively absorb at wavelengths of about 700 nm or longer. More particularly, compounds such as the products of Examples 1E and 46 selectively absorb ruby-laser radiation at 694 nm. The compounds may be used in transparent plastics, and are readily synthesized on the scale desired.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A composition of matter comprising a squarylium dyestuff compound soluble in an organic solvent and having the formula

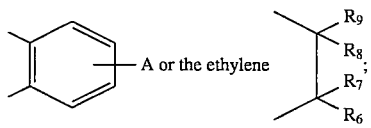

where each Rn is

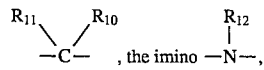

in which $R_1$ and $R_3$ are hydrogen, alkyl, alkoxy or halogen; $R_2$ and $R_{12}$ are alkyl or aryl; $R_4$ is hydrogen or alkyl; $R_5$ is alkyl or $$-\underset{\underset{O}{\|}}{C}-R,$$

R being hydrogen or alkyl or aryl; X is the ortho-phenylene

A or the ethylene

Y is the methylene $-\underset{\underset{C}{|}}{C}-$ , the imino —N—,

—O—, —S— or —Se—; A is hydrogen, alkyl, hydroxy, alkoxy, amino, monoalkylamino or dialkylamino; and $R_6$ through $R_{11}$ are hydrogen, alkyl or aryl; provided that $R_1$ and $R_3$ may further be alkylene or alkylenoxy, that $R_2$ and $R_6$ through $R_{12}$ may further be alkylene or methylidyne, that $R_4$ and $R_5$ and R may further be alkylene, that one or more pairs of said further R and $R_1$ through $R_{12}$ each have a common bond and form a ring of five or six members, that $R_9$ and $R_{10}$ or $R_9$ and $R_{12}$ may also constitute a direct bond, and that if X is said ethylene then Y may also be a direct bond.

2. A composition as in claim 1 wherein if one of $R_1$ and $R_3$ is halogen then it is fluorine, chlorine or bromine, if one of $R_1$ and $R_3$ and A is alkoxy then it is $C_1$–$C_4$ alkoxy, and if one of $R_1$ through $R_{12}$ and R and A is alkyl then it is $C_1$–$C_4$ alkyl.

3. A composition as in claim 1 in which Y is said methylene or a direct bond.

4. A composition as in claim 1 wherein Y is a direct bond, X being said ethylene.

5. A composition as in claim 4 in which $R_4$ is hydrogen and $R_5$ is —COR.

6. A composition as in claim 5 in which R, $R_2$, $R_7$, $R_8$ and $R_9$ are $C_1$–$C_4$ alkyl.

7. A composition as in claim 5 in which R, $R_2$, $R_7$, $R_8$ and $R_9$ are methyl; and $R_1$, $R_3$ and $R_6$ are hydrogen.

8. A composition as in claim 4 in which $R_4$ is alkyl and $R_5$ is —COR.

9. A composition as in claim 8 in which R, $R_2$, $R_4$, $R_7$, $R_8$ and $R_9$ are $C_1$–$C_4$ alkyl.

10. A composition as in claim 8 in which R, $R_2$, $R_4$, $R_7$, $R_8$ and $R_9$ are methyl; and $R_1$, $R_3$ and $R_6$ are hydrogen.

11. A composition as in claim 4 in which $R_4$ and $R_5$ are alkyl.

12. A composition as in claim 11 in which $R_2$, $R_4$, $R_5$, $R_7$, $R_8$ and $R_9$ are $C_1$–$C_4$ alkyl.

13. A composition as in claim 11 in which $R_2$, $R_4$, $R_5$, $R_7$, $R_8$ and $R_9$ are methyls; and $R_1$, $R_3$ and $R_6$ are hydrogen.

14. A composition as in claim 1 in which Y is said methylene.

15. A composition as in claim 14 in which X is said ethylene.

16. A composition as in claim 15 in which $R_4$ is hydrogen and $R_5$ is —COR.

17. A composition as in claim 16 in which R and $R_2$ are $C_1$–$C_4$ alkyl.

18. A composition as in claim 16 in which R and $R_2$ are methyl; and $R_1$, $R_3$ and $R_6$ through $R_{11}$ are hydrogen.

19. A composition as in claim 14 in which X is said ortho-phenylene.

20. A composition as in claim 19 in which $R_2$, $R_4$ and $R_5$ are $C_1$–$C_4$ alkyl.

21. A composition as in claim 19 in which A is $C_1$–$C_4$ alkyl, $C_1$–$C_4$ alkoxy, $C_1$–$C_4$ monoalkylamino or di($C_1$–$C_4$ alkyl)amino.

22. A composition as in claim 19 in which $R_2$, $R_4$ and $R_5$ are methyl; A is dimethylamino; and $R_1$, $R_3$, $R_{10}$ and $R_{11}$ are hydrogen.

23. A composition as in claim 1 in which Y is said imino.

24. A composition as in claim 23 in which X is said ethylene and $R_2$ is the same as $R_{12}$.

25. A composition as in claim 23 in which X is said ortho-phenylene.

26. A composition as in claim 25 in which $R_2$ is aryl and $R_{12}$ is alkyl.

27. A composition as in claim 25 in which $R_4$, $R_5$ and $R_{12}$ are $C_1$–$C_4$ alkyl.

28. A composition as in claim 25 in which A is hydrogen, $C_1$–$C_4$ alkyl, $C_1$–$C_4$ alkoxy, $C_1$–$C_4$ monoalkylamino or di($C_1$–$C_4$ alkyl)amino.

29. A composition as in claim 25 in which $R_2$ is phenyl; $R_4$, $R_5$ and $R_{12}$ are methyl; $R_1$ and $R_3$ are hydrogen and A is hydrogen or dimethylamino.

30. A composition as in claim 1 in which Y is —O—, —S— or —Se—; and X is said ethylene.

31. A composition as in claim 1 in which if one of R and $R_1$ through $R_{12}$ and A is alkyl or alkylene then it may have only alkyl, aryl, hydroxy, alkoxy and acyloxy substituents and if one of R and $R_2$ and $R_6$ through $R_{12}$ is aryl then it may have only alkyl and alkoxy substituents.

32. A composition as in claim 1 in which only one of R and $R_1$ through $R_{12}$ and A has one or more substituents.

33. A composition as in claim 1 in which none of R and $R_1$ through $R_{12}$ and A has more than one substituent.

34. A composition as in claim 1 in which none of R and $R_1$ through $R_{12}$ and A has a substituent.

35. A composition as in claim 1 in which said compound is incorporated in an organic plastic material capable of transmitting visible light.

36. A composition as in claim 35 in which said material is transparent.

37. A composition as in claim 35 in which said material comprises polycarbonate, poly(methyl methacrylate), poly-(allyl diglycol carbonate) or a cellulose derivative.

38. A composition as in claim 35 in which said material is polycarbonate.

39. A composition as in claim 1 in which said compound is dissolved in an organic solvent.

40. Matter as in claim 1 wherein the composition is a liquid.

41. Matter as in claim 1 wherein the composition is a solid.

42. Matter as in claim 1 wherein the composition is a solid and the compound ranges by weight between 85% and 99.7%.

43. Matter as in claim 1 wherein the composition is a solid and the compound ranges by weight between 92% and 97%.

44. Matter as in claim 1 wherein the composition is a solid and some of the compound is in a crystalline form.

* * * * *

UNITED STATES PATENT AND TRADEMARK OFFICE
CERTIFICATE OF CORRECTION

PATENT NO. : 5,543,086
DATED : August 6, 1986
INVENTOR(S) : Robert C. Bertelson and Robert A. Sallavanti It is certified that error appears in the above-identified patent and that said Letters Patent is hereby corrected as shown below:

Column 12:

Claim 1, line 23 - leftmost "R5" of formula should read -- R4 --.

Column 17:

Claim 13, line 14 - "methyls" should read -- methyl --.

Signed and Sealed this

Fifth Day of November, 1996

Attest:

BRUCE LEHMAN

Attesting Officer    Commissioner of Patents and Trademarks